Figure 1:
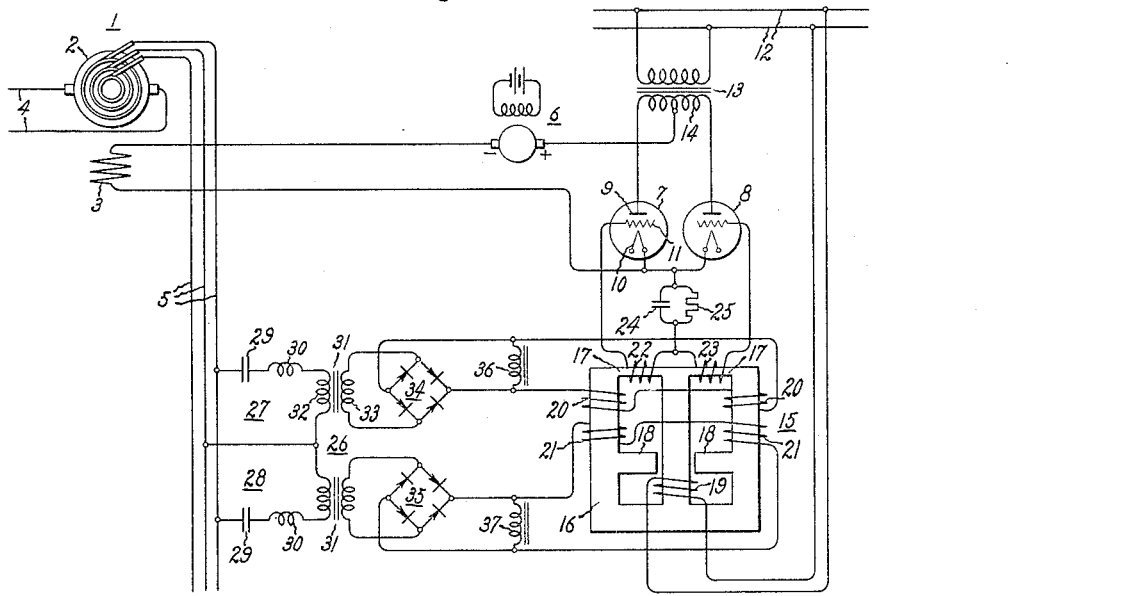

May 9, 1939.  A. SCHMIDT, JR  2,157,834

ELECTRIC REGULATING SYSTEM

Filed Dec. 1, 1936

Inventor:
August Schmidt, Jr.
by Harry E. Dunham
His Attorney.

Patented May 9, 1939

2,157,834

UNITED STATES PATENT OFFICE 2,157,834

ELECTRIC REGULATING SYSTEM

August Schmidt, Jr., Schenectady, N. Y., assignor to General Electric Company, a corporation of New York Application December 1, 1936, Serial No. 113,628

2 Claims. (Cl. 250—27)

My invention relates to electric regulating systems and more particularly to electric valve systems for regulating the speed of dynamo-electric machines.

Heretofore there have been devised numerous arrangements for controlling the speed of dynamo-electric machines. These prior art arrangements have necessitated the use of apparatus which is expensive and intricate in construction and arrangement. It has been found desirable to employ in regulating systems of this character electronic discharge devices of the type employing ionizable mediums, such as gases and vapors, because of the particular adaptability of this type of electronic discharge device to circuits designed to conduct relatively large amounts of current. Furthermore, it has become evident that the prior art arrangements were not entirely satisfactory for the control of electronic discharge devices of this type in electric regulating systems where it is desired to effect precise and accurate control of the frequency of an associated alternating current circuit or of associated dynamo-electric machines such as synchronous generators and synchronous converters.

It is an object of my invention to provide a new and improved electric regulating system.

It is another object of my invention to provide a new and improved electric valve regulating system for controlling the speed of dynamo-electric machines.

It is a further object of my invention to provide a new and improved electric valve regulating system for controlling the frequency of an associated alternating current circuit or for controlling the frequency of an associated alternating current dynamo-electric machine.

It is a still further object of my invention to provide a new and improved electric valve regulating system for controlling the energization of a field winding of a synchronous converter in accordance with the frequency of the alternating current circuit of the converter or in accordance with the frequency of an associated alternating current circuit.

In accordance with the illustrated embodiment of my invention, I provide an improved electric valve regulating system for controlling the energization of a field winding, of an alternating current converter operating as an inverter for transmitting energy between a direct current circuit and an alternating current circuit. Electric valve means of the type employing ionizable mediums, such as gases or vapors, and having control members, are interposed between the field winding and an auxiliary source of alternating current for controlling the energization of the field winding and hence effect control of the speed of the converter. A self-saturating transformer, energized from any suitable source of alternating current, provides alternating voltages of peaked wave form for energizing the control members of the associated electric valve means to control the conductivity thereof. The self-saturating transformer is also provided with windings for controlling the phase of the alternating voltages of peaked wave form. To control the energization of the phase controlling windings in accordance with the frequency of the alternating current circuit of the converter or in accordance with the frequency of an associated alternating current circuit, I provide a frequency selective circuit comprising two resonant circuits which are arranged to be energized from the dynamo-electric machine or from the associated circuit. One of the resonant circuits is designed to have a natural resonance frequency slightly greater than the normal operating frequency of the dynamo-electric machine and the other of the resonant circuits is designed to have a natural resonance frequency slightly less than the normal operating frequency of the dynamo-electric machine. Rectifying devices are connected to be energized from the resonant circuits and are used to supply to the phase controlling windings of the self-saturating transformer direct currents which vary in accordance with the frequency of the converter or in accordance with the frequency of the alternating current circuit.

For a better understanding of my invention, reference may be had to the following description taken in connection with the accompanying drawing and its scope will be pointed out in the appended claims. Referring to the accompanying drawing, Fig. 1 diagrammatically illustrates an embodiment of my invention as applied to an electric valve regulating system for controlling the frequency of a dynamo-electric machine, and Fig. 2 represents certain operating characteristics of the embodiment of my invention shown in Fig. 1.

Figure 2:
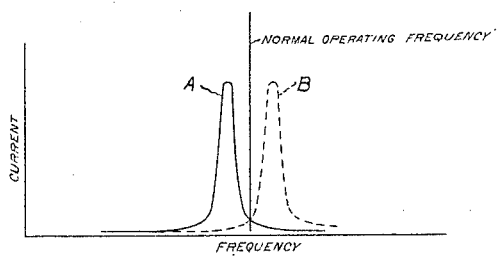

In Fig. 1 of the accompanying drawing there is diagrammatically shown an embodiment of my invention as applied to an electric valve regulating system for controlling the speed of a dynamo-electric machine to effect control of the frequency of the output voltage of the machine. For the purpose of explaining my invention, I have chosen to illustrate my invention as applied to a regulating system for controlling the speed of a rotary converter 1 having an armature member 2 and a field winding 3. The armature member 2 is shown as being energized from any suitable source of direct current 4 and connected to energize a polyphase alternating current load circuit 5. The field winding 3 of the rotary converter 1 is energized from any suitable source of direct current such as a generator 6. In order to control the energization of the field winding 3, I provide electric valve means 7 and 8 preferably of the type employing ionizable mediums, such as gases and vapors, and each including an anode 9, a cathode 10 and a control member 11. The electric valve means 7 and 8 are interposed between the field winding 3 and a suitable source of alternating current 12 and effect control of the energization of the field winding 3 by transmitting variable amounts of direct current between the alternating current circuit 12 and the field winding 3 through a transformer 13 having a secondary winding 14. The positive terminal of the armature winding of the generator 6 is connected to an electrical intermediate tap or connection of the secondary winding 14 of transformer 13 so that the generator 6 and the electric valve means 7 and 8 effectively operate as two direct current sources in series.

To impress on the control members 11 of electric valve means 7 and 8 voltages variable in phase and having peaked wave forms, I provide a self-saturating transformer 15. The transformer 15 is provided with a core member 16 having sections 17 designed to become highly saturated and having shunt paths 18 arranged to shunt the flux upon saturation of the sections 17. The self-saturating transformer 15 is also provided with a winding 19 which is energized from any suitable source of alternating current, such as the alternating current circuit 12, phase controlling windings 20 and 21 and windings 22 and 23 in which are induced voltages of peaked wave form. The phase controlling windings 20 and 21 are arranged on the core member 16 to determine the point in the cycle of alternating voltage at which the resultant magnemotive force passes through zero and thus determine the phase of the alternating voltages induced in windings 22 and 23 relative to the voltages impressed on the anodes 9 of electric valve means 7 and 8. The phase controlling windings 20 are wound on the core member 16 to effect a retardation, upon increase in energization thereof, in the phase of the voltages induced in windings 22 and 23 relative to the voltages impressed on anodes 9 of electric valve means 7 and 8, and the phase controlling windings 21 are wound on the core member 16 so that an increase in energization of these windings effects an advancement in the phase of the voltage induced in windings 22 and 23 relative to the voltages impressed on the anodes 9 of electric valve means 7 and 8. In order to impress on the control members 11 of electric valve means 7 and 8 a negative unidirectional biasing potential, I employ a self-biasing type of circuit including a capacitance 24 and a resistance 25 connected in parallel relation with each other and connected in series relation with the windings 22 and 23 and the control members 11. It will be understood that if it is desired there may be employed other suitable means, such as batteries, for providing the negative unidirectional biasing potential.

I provide a frequency selective circuit 26 comprising resonant circuits 27 and 28 each including a serially connected capacitance 29 and inductance 30. Each of the resonant circuits 27 and 28 is provided with a transformer 31 having a primary winding 32 and a secondary winding 33, and each of these circuits supplies to the associated transformer a current which varies in accordance with the frequency of the alternating current circuit 5 to which the resonant circuits are connected. The secondary windings 33 of transformers 31 are connected to suitable rectifying devices 34 and 35 which may be of the contact rectifying type or any of the arrangements well known in the art. Inductive reactances 36 and 37 are connected across the output terminals of the rectifiers 34 and 35 and serve as a means for damping electrical oscillations which may be present in the output circuits of these rectifying devices. The output terminals of rectifiers 34 and 35 are connected to energize in series relation phase controlling windings 20 of the self-saturating transformer 15, and the rectifier 35 is connected to energize in series relation the phase controlling windings 21 of the self-saturating transformer 15. The resonant circuit 27 is designed, by the choice of the constants of the circuit, principally the capacitance 29 and the inductance 30, to have a natural resonance frequency slightly less than the normal operating frequency of the alternating current circuit 5, and the resonant circuit 28 is designed to have a natural resonance frequency slightly greater than the normal operating frequency of the alternating current circuit 5.

Although I have chosen to represent my invention as applied to a regulating system for controlling the speed of a rotary converter, it should be understood that my invention in its broader aspects may be applied to electric translating apparatus generally where it is desired to control the speed of associated equipment or to control the frequency of an associated alternating current circuit. For example, the electric valve means 7 and 8 may be employed to control a governor of a turbo-alternator to effect control of the frequency of an alternating current circuit. Furthermore, the electric regulating system including the electric valve means 7 and 8 may be employed to control the speed of a direct current motor connected to drive an alternating current generator. As a still further modification, the speed of a direct current motor may be controlled by utilizing my invention where an auxiliary or pilot alternating current generator is driven by a direct current motor, the speed of which is to be controlled. The frequency of the output circuit of the auxiliary or pilot alternating current generator will, of course, vary in accordance with the speed of the direct current motor and this output circuit may be employed to energize the frequency selective circuit to effect the desired control in the speed of the direct current motor.

The operation of the electric valve regulating system diagrammatically shown in Fig. 1 may be best explained by considering the system when the dynamo-electric machine 1 is operating as an inverter to transmit electrical energy from the direct current circuit 4 to the polyphase alternating current circuit 5. The regulating system comprising the electric valve means 7 and 8 will control the energization of the field winding 3 so that the speed of the dynamo-electric machine 1 is maintained at a predetermined value corresponding to the normal operating frequency of the alternating current circuit 5. The generator 6 is connected in series relation with the electric valve means 7 and 8 and the relative magnitudes of the two voltages may be chosen so that the generator 6 supplies the greater part of the power supplied to the field winding 3. Under normal operating conditions, that is when the frequency of the alternating current circuit 5 is substantially the same as the normal operating frequency, the output voltage of the electric valve means 7 and 8 is substantially zero so that the generator 6 supplies all of the energy to the field winding 3. As will be well understood by those skilled in the art, the conductivity of the electric valve means 7 and 8, and hence the voltages which these electric valve means impress on the load circuit comprising the field winding 3 and the armature winding of generator 6, may be controlled by controlling the phase relationship between the voltages impressed on the control members 11 and the voltages appearing between the associated anodes 9 and cathodes 10. When there is substantial phase coincidence between the voltages impressed on control members 11 and the voltages impressed on the associated anodes 9, it will be understood that the voltage impressed by the electric valve means 7 and 8 on the load circuit will be a maximum. On the other hand, when there is substantial opposition between the voltages impressed on the control members 11 and the voltages impressed on the anodes 9, the voltage impressed on the associated load circuit by the electric valve means 7 and 8 will be a minimum. The excitation circuit for the electric valve means 7 and 8 is arranged so that when the frequency of the alternating current circuit 5 is substantially the same as the normal operating frequency, the voltages impressed on the control members 11 of electric valve means 7 and 8 by windings 22 and 23 of the self-saturating transformer 15 are retarded in phase relative to the voltages impressed on anodes 9 of these electric valves so that the voltage supplied by the electric valve means 7 and 8 is substantially zero.

If it be assumed that the frequency of the alternating current circuit 5 decreases to a value less than the normal operating frequency, the resonant circuit 27, through rectifier 34, will increase the energization of the phase controlling windings 20 of the self-saturating transformer 15 so that the voltage impressed on control members 11 of electric valve means 7 and 8 is retarded in phase to introduce in the field circuit 3 of machine 1 an effective resistance which tends to decrease the current flowing through the field winding 3. In this manner the speed of the dynamo-electric machine 1 will be increased to attain a speed corresponding to the normal operating frequency. The manner in which the resonant circuit 27 controls the energization of the phase controlling windings 20 in accordance with the variations in the frequency of the alternating current circuit 5 may be best explained by considering the operating characteristics of the resonant circuits 27 and 28 as shown in Fig. 2. Curve A of Fig. 2 represents the rms value of current flowing in the resonant circuit 27 as a function of the frequency of the voltage of the alternating current circuit 5, and curve B represents the rms value of the current flowing in circuit 28 as a function of the frequency of the voltage of alternating current circuit 5. It will be noted that the natural resonance frequency of the resonant circuit 27, as represented by the maximum value of curve A, is slightly less than the normal operating frequency of the alternating current circuit 5, and that the natural resonance frequency of the resonant circuit 28 is slightly greater than the normal operating frequency of the alternating current circuit 5.

If the frequency of the alternating current circuit 5 increases to a value greater than the normal operating frequency, the current in resonant circuit 28 will be increased so that the direct current supplied to the phase controlling windings 21 of the self saturating transformer 15 by the rectifier 35 will be increased to effect an advancement in phase of the voltages impressed on the control members 11 relative to the voltages impressed on the associated anodes 9 of electric valve means 7 and 8. In this manner, the electric valve means 7 and 8 will impress on field winding 3 a voltage tending to assist the voltage of the generator 6 so that the current in the field winding 3 is increased, thereby effecting a reduction in speed and hence a reduction in the frequency of the alternating current circuit 5. In this manner the electric valve regulating system will tend to maintain the speed of the dynamo-electric machine 1 at a value corresponding to the normal operating frequency of the alternating current circuit 5 by controlling the energization of the field winding 3.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim is new and desire to secure by Letters Patent of the United States is:

1. In combination, an alternating current supply circuit, a load circuit, electric valve means interposed between said circuits for controlling the energization of said load circuit and including a control member for controlling the conductivity of said electric valve means, a second alternating current circuit, and a control circuit for controlling the frequency of said second mentioned alternating current circuit comprising a frequency selective circuit including two resonant circuits, one of said resonant circuits having a natural resonance frequency corresponding to a frequency greater than the frequency of said second mentioned alternating current circuit and the other of said resonant circuits having a natural resonance frequency less than the frequency of said second mentioned alternating current circuit, rectifying means associated with each of said resonant circuits for supplying direct currents which vary in accordance with the frequency of said second mentioned alternating current circuit and saturable inductive means selectively controlled by said resonant circuits for impressing on said control member an alternating voltage variable in phase for controlling the conductivity of said electric valve means in accordance with said direct currents.

2. In combination, an alternating current supply circuit, a load circuit, electric valve means having a control member and being interposed between said supply circuit and said load circuit for controlling the energization of said load circuit, means comprising a self-saturating transformer for impressing on said control member an alternating voltage of peaked wave form and including windings for controlling the phase of said alternating voltage, a second alternating current circuit, and means for controlling the phase of said alternating voltage in accordance with the frequency of said second mentioned alternating current circuit comprising a frequency selective circuit including a pair of resonant circuits, one of said resonant circuits having a natural resonance frequency greater than the frequency of said second mentioned alternating current circuit and the other of said resonant circuits having a natural resonance frequency less than the frequency of said second mentioned alternating current circuit and a pair of rectifying means energized from said resonant circuits for controlling the energization of said phase controlling windings of said self-saturating transformer.

AUGUST SCHMIDT, Jr.